US005742218A

United States Patent [19]

Yamaguchi

[11] Patent Number: 5,742,218

[45] Date of Patent: Apr. 21, 1998

[54] FLYBACK TRANSFORMER

[75] Inventor: Soji Yamaguchi, Shiga-ken, Japan

[73] Assignee: Murata Manufacturing Co., Ltd., Nagaokakyo, Japan

[21] Appl. No.: 606,943

[22] Filed: Feb. 26, 1996

[30] Foreign Application Priority Data

Feb. 27, 1995 [JP] Japan .................................... 7-038044

[51] Int. Cl.[6] .............................. H01F 27/40; H02M 7/06

[52] U.S. Cl. ............................................... 336/192; 363/68

[58] Field of Search ..................... 363/68, 126; 336/170, 336/199, 200, 211; 29/546.6

[56] References Cited

U.S. PATENT DOCUMENTS 5,138,545 8/1992 Godawski ................................ 363/68
5,396,696 3/1995 Kurogi et al. ......................... 29/564.6

FOREIGN PATENT DOCUMENTS 0 324 084 7/1989 European Pat. Off. .
6 325944 11/1994 Japan .
7 037738 2/1995 Japan .
7 254521 10/1995 Japan .
2 287 359 9/1995 United Kingdom .

*Primary Examiner*—Peter S. Wong
*Assistant Examiner*—Rajnikant B. Patel
*Attorney, Agent, or Firm*—Burns, Doane, Swecker & Mathis, LLP

[57] ABSTRACT

In a flyback transformer, mounting pins for mounting components protrude from each of projecting jaw sections of a bobbin of a high-voltage coil section. A holder for the anode lead is positioned and secured to the bobbin, and the mounting pin which serves as the anode end of the high-voltage coil section is electrically connected to electrically conductive rubber or a connection fitting provided at one end of the holder. The flyback transformer comprises a connection pin having a male-contact shape protruding from one of the jaw sections. The connection pin is inserted into and held by the electrically conductive rubber or the connection fitting provided for the holder and is electrically connected to the mounting pin serving as the anode end of the high-voltage coil section.

12 Claims, 6 Drawing Sheets

FLYBACK TRANSFORMER

BACKGROUND OF THE INVENTION

1. Field of the Invention

The present invention relates to a flyback transformer and, more particularly, to a structure for connecting a high-voltage secondary coil section to an anode lead of a flyback transformer.

2. Description of the Related Art

A flyback transformer for supplying d.c. high voltages for horizontal deflection to a cathode-ray tube such as in a television receiver is comprised of a pair of ferrite cores 1, a low-voltage primary coil section 2 provided around the leg section of one of the pair of ferrite cores 1, and a high-voltage secondary coil section 3 provided around the low-voltage primary coil section 2, as shown in FIGS. 7 and 8. In these figures, only the high-voltage coil section 3 and sections directly connected thereto are indicated with solid lines. The other sections are indicated with virtual lines. Around the high-voltage coil section 3, a case is provided, which is not shown. Insulating resin is to fill the case, and a focus pack is to be mounted to the outside surface of the case.

The high-voltage coil section 3 comprises a bobbin 4 and a high-voltage winding 5. Jaw sections **4*a* disposed at both ends of the bobbin 4 are provided with several protruding mounting pins 6. Corresponding mounting pins 6 disposed at each of the jaw sections 4*a* are connected by mounting components 7, such as diodes and resistors, to the pins 6. Each mounting pin 6 is connected to the corresponding end of one of a plurality of portions formed by dividing the high-voltage winding 5. As a result, each mounted component 7 is connected to an end or a middle point of the high-voltage winding 5. In other words, the leftmost component 7E among the mounted components 7 in FIGS. 7 and 8 is connected to the anode end of the high-voltage winding 5 and to the corresponding mounting pin 6E which serves as the anode end of the high-voltage coil section 3**, for example.

A cylindrical holder 8 for holding an anode lead (not shown) from a cathode-ray tube is secured at the specified position against the bobbin 4 of the high-voltage coil section 3. The tip of the anode lead is electrically connected to electrically conductive rubber 9 provided at one end (the bottom end in FIGS. 7 and 8) in the cylindrical holder 8. The cylindrical holder 8 can be secured at the specified position against the bobbin 4 with various means. In FIG. 7, a protrusion 10 provided on the bobbin 4 is fit into a key-slot fitting hole 11 of the cylindrical holder 8.

The electrically conductive rubber 9 of the cylindrical holder 8 as described above is connected to the anode end of the high-voltage coil section 3. As explicitly shown in FIG. 8, a connection pin 12 is stuck into the electrically conductive rubber 9 in advance. A lead 7Ea is drawn through the mounting pin 6E, which serves as the anode end and is provided on the jaw sections 4a of the bobbin 4. The lead 7Ea is connected to the connection pin 12 by soldering or crimping. This connection may be completed by providing a connection fitting (not shown) at the inner end of the cylindrical holder 8 instead of the electrically conductive rubber 9, and by inserting the connection pin 12 into the connection fitting to support the pin. Other suitable connection mechanisms will be evident to those skilled in the art.

In manufacturing the conventional flyback transformer, a process is at least required for soldering or crimping the lead 7Ea to the connection pin 12 in the cylindrical holder 8, in addition to the process for positioning and securing the cylindrical holder 8 to the bobbin 4 of the high-voltage coil section 3. These connections increase the number of processes and thereby reduce the production efficiency. When the lead 7Ea is soldered, the high-voltage winding 5 is liable to be short-circuited due to the scattering of solder. When the lead 7Ea is crimped, a break in the wire is liable to occur due to mechanical stress which influences on the mounted components 7 and the high-voltage winding 5 through the lead 7Ea.

SUMMARY OF THE INVENTION

The present invention has been made to solve the foregoing problems. It is an object of the present invention to provide a flyback transformer having a simplified structure for the connection between the high-voltage coil section and the anode lead.

The foregoing object is achieved through the provision of a flyback transformer wherein mounting pins for mounting components protrude from each of the jaw sections of a bobbin of a high-voltage coil section, a holder for the anode lead is positioned and secured to the bobbin, and the mounting pin which serves as the anode end of the high-voltage coil section is electrically connected to electrically conductive rubber or a connection fitting provided at one end of the holder, the flyback transformer comprising a connection pin having a male-contact shape protruding from one of the jaw sections, the connection pin being inserted into and held by the electrically conductive rubber or the connection fitting provided for the holder after being electrically connected to the mounting pin serving as the anode end of the high-voltage coil section.

With the above-described structure, simply inserting the connection pin connected to the mounting pin serving as the anode end of the high-voltage coil section into the electrically conductive rubber or the connection fitting provided in the holder electrically connects the anode end of the high-voltage coil section and the anode lead to each other. Unlike the conventional flyback transformer, there is no need for soldering or crimping conductive leads. The structure for connecting the high voltage coil section and the anode lead has been simplified with this invention. In addition, a problem such as creating a short circuit or breaking a lead wire due to soldering or crimping, which are required in the conventional flyback transformer assembly processes, is unlikely to occur, thereby increasing the reliability of the flyback transformer.

DETAILED DESCRIPTION OF THE PREFERRED EMBODIMENT

Figure 1:
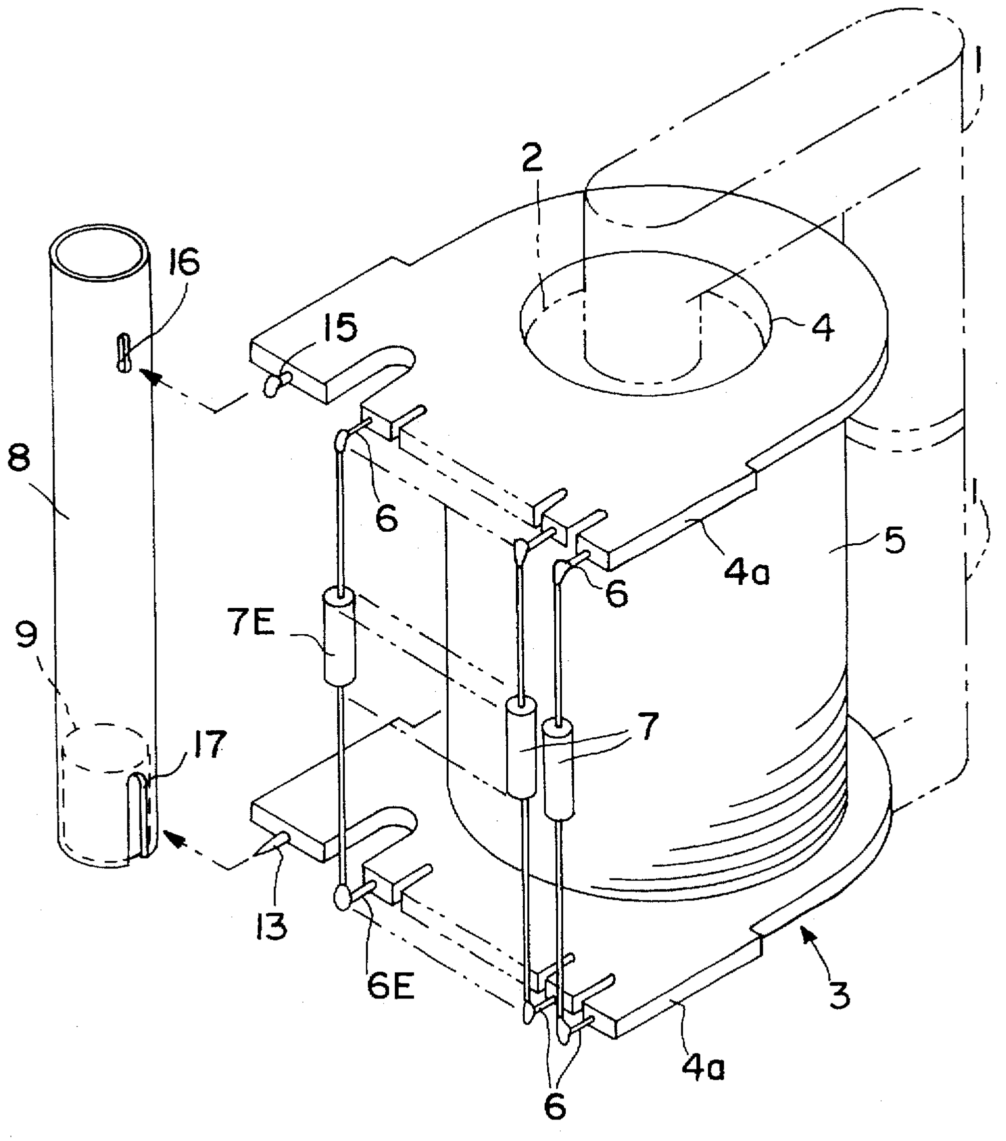
FIG. 1 is a simplified perspective view illustrating the structure of a flyback transformer according to a first embodiment of the present invention, with a cylindrical holder being not mounted.

Preferred embodiments of a flyback transformer according to the present invention will be described below by referring to the drawings.

Figure 2:
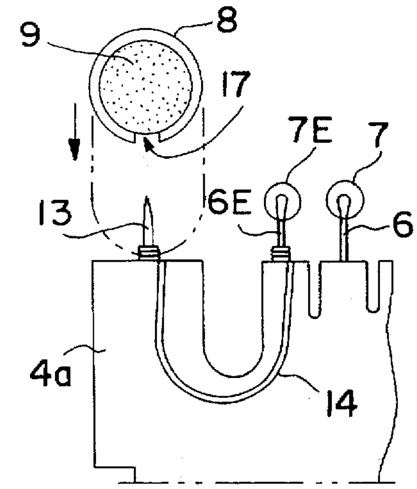
FIG. 2 is a bottom view showing the structure of the main portion of a high-voltage coil section according to the first embodiment.

FIG. 1 is a simplified perspective view illustrating the structure of a flyback transformer according to a first embodiment of the present invention. FIG. 2 is a bottom view showing the structure of the main portion of a high-voltage coil section according to the first embodiment.

In the figures, there is shown a pair of ferrite cores 1, a low-voltage primary coil section 2 provided around the leg section of one of the pair of ferrite cores 1, and a high-voltage secondary coil section 3 provided around the low-voltage primary coil section 2. In FIG. 1, only the high-voltage coil section 3 and sections directly connected thereto are indicated with solid lines. Around the high-voltage coil section 3, a case is provided, which is not shown. Insulating resin fills the case, and a focus pack is mounted to the outside surface of the case.

The high-voltage coil section 3 according to the present invention comprises a bobbin 4 and a high-voltage winding 5 in the same configuration as the conventional high voltage coil section. Jaw sections 4*a* disposed at both ends of the bobbin 4 and project out in a cantilevered fashion from one side of the bobbin 4. The jaw sections 4*a* are provided with several protruding mounting pins 6. The corresponding mounting pins 6 disposed at each of the jaw sections 4*a* are connected by mounting components 7, such as diodes, to the pins. A cylindrical holder 8 for holding an anode lead (not shown) from a cathode-ray tube is provided. At one end (the bottom end in FIG. 1) and inside the holder 8, an electrically conductive rubber 9 is provided to which the tip of the anode lead is electrically connected. The leftmost component 7E among the mounted components 7 in FIG. 1 is connected to the anode end of the high-voltage winding 5 and the corresponding mounting pin 6E serves as the anode end of the high-voltage coil section 3.

In this embodiment, a connection pin 13 protrudes at a position adjacent to that of the mounting pin 6E which serves as the anode end of the high-voltage coil section 3 and protrudes from one of the jaw sections 4*a*. The connection pin 13 has a male-contact shaped like a straight needle. This connection pin 13 is electrically connected to the mounting pin 6E serving as the anode end of the high-voltage coil section 3 with a lead 14 as shown in FIG. 2. A protrusion 15 having an enlarged head portion as a lock is integrally formed with the other one of the jaw sections 4*a* of the bobbin 4 at the position corresponding to that of the connection pin 13 in the first jaw section 4*a*.

The cylindrical holder 8 is positioned and secured between both jaw sections 4*a* of the bobbin 4. A fitting hole 16 is formed at the top end of the cylindrical holder 8, into which the protrusion 15 provided for one of the jaw sections 4*a* of the bobbin 4 is fit. The fitting hole 16 may have the shape of a key-hole. At the bottom circumferential surface of the cylindrical holder 8, a slit 17 having the specified width is formed such that the electrically conductive rubber 9, held in the inside of the cylindrical holder 8, is exposed. The slit 17 is formed at the position corresponding to that of the connection pin 13 on the bobbin 4. When the protrusion 15 is fit into the fitting hole 16 and the cylindrical holder 8 is positioned and secured to the bobbin 4, the connection pin 13 is stuck into the electrically conductive rubber 9 through the slit 17.

With the above-described structure, fitting the protrusion 15 on the bobbin 4 into the fitting hole 16 on the cylindrical holder 8 positions and secures the holder 8 to the bobbin 4. In this case, as the holder 8 is secured at the specified position, the connection pin 13 provided for one of the jaw sections 4*a* of the bobbin 4 is stuck into the electrically conductive rubber 9 in the holder 8 from the side. Since the connection pin 13 has already been connected to the adjacent mounting pin 6E, the electrically conductive rubber 9 in the holder 8 is connected to the anode end of the high-voltage coil section 3. As described above, the anode end of the high-voltage coil section 3 is automatically connected to the electrically conductive rubber 9 held in the holder 8 by positioning and securing the holder 8 against the bobbin 4 of the high-voltage coil section 3. There is no need to do other connection work after the holder 8 is secured at the specified position.

Figure 3:
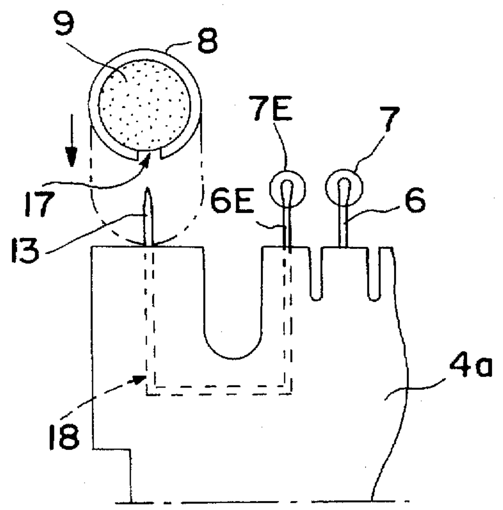
FIG. 3 is a bottom view showing the structure of the main portion of a high-voltage coil section according to a second embodiment of the present invention.

FIG. 3 is a bottom view illustrating the structure of the main portion of a high-voltage coil section according to a second embodiment of the present invention. A connection pin 13 and the mounting pin 6 which serves as the anode end of the high-voltage coil section 3 according to the second embodiment are manufactured as a unit and then formed in a bobbin. In other words, the connection pin 13 and the mounting pin 6 are, for example, continuously formed with wire 18 having a U shape or having two right angles, and the central part of the wire 18 is embedded in one of the jaw sections 4*a* of the bobbin 4.

Figure 4:
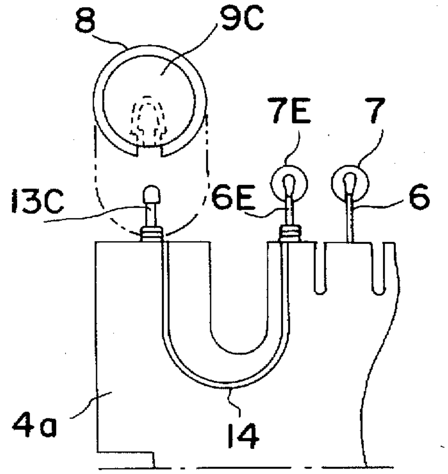
FIG. 4 is a bottom view showing the structure of the main portion of a high-voltage coil section according to a third embodiment of the present invention.

FIG. 4 is a bottom view illustrating the structure of the main portion of a high-voltage coil section according to a third embodiment of the present invention. A cylindrical holder 8 is provided with a female-contact spring connection fitting 9C which clamps onto a male-contact connection fitting 13C. In the first and second embodiments, the cylindrical holder 8 is provided with the electrically conductive rubber 9, and the straight needle-shaped connection pin 13 is stuck into the electrically conductive rubber 9. The present invention is not restricted to this structure. The structure shown in FIG. 4 may be used, for example.

Figure 5:
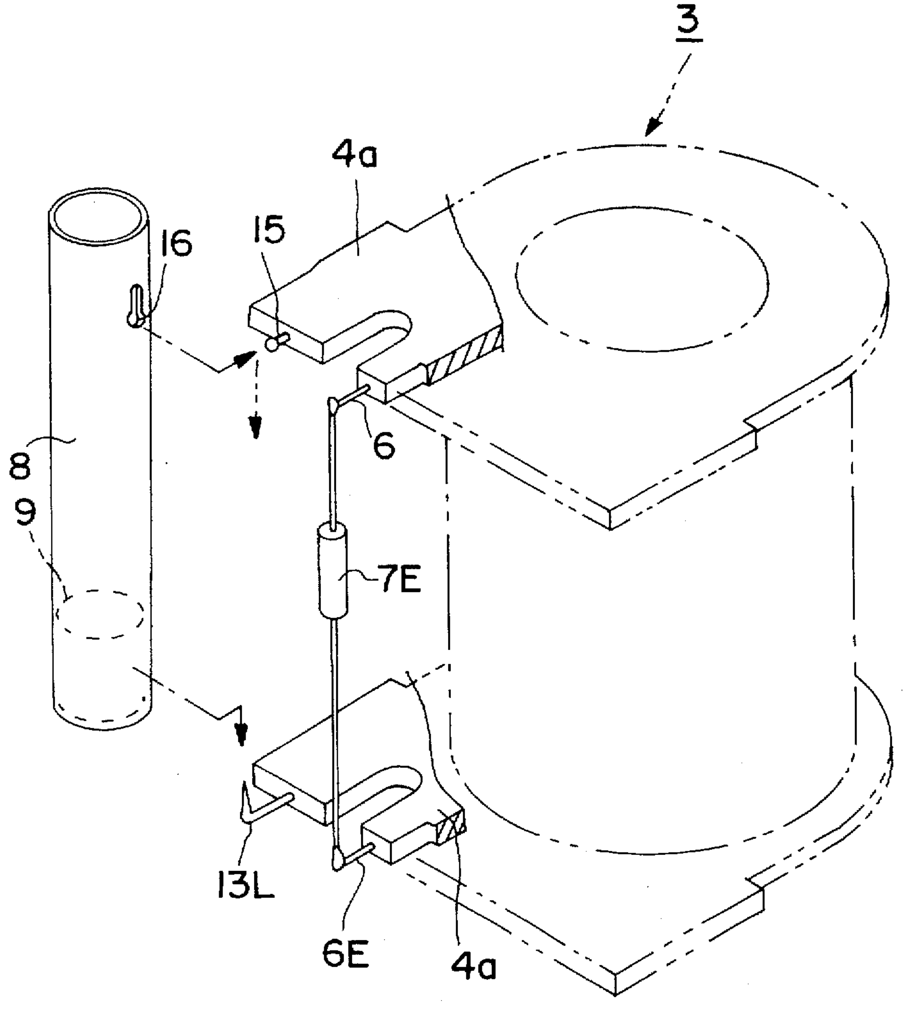
FIG. 5 is a simplified perspective view illustrating the whole structure of a high-voltage coil section of a flyback transformer according to a fourth embodiment of the present invention, with a cylindrical holder being not mounted.
Figure 6:
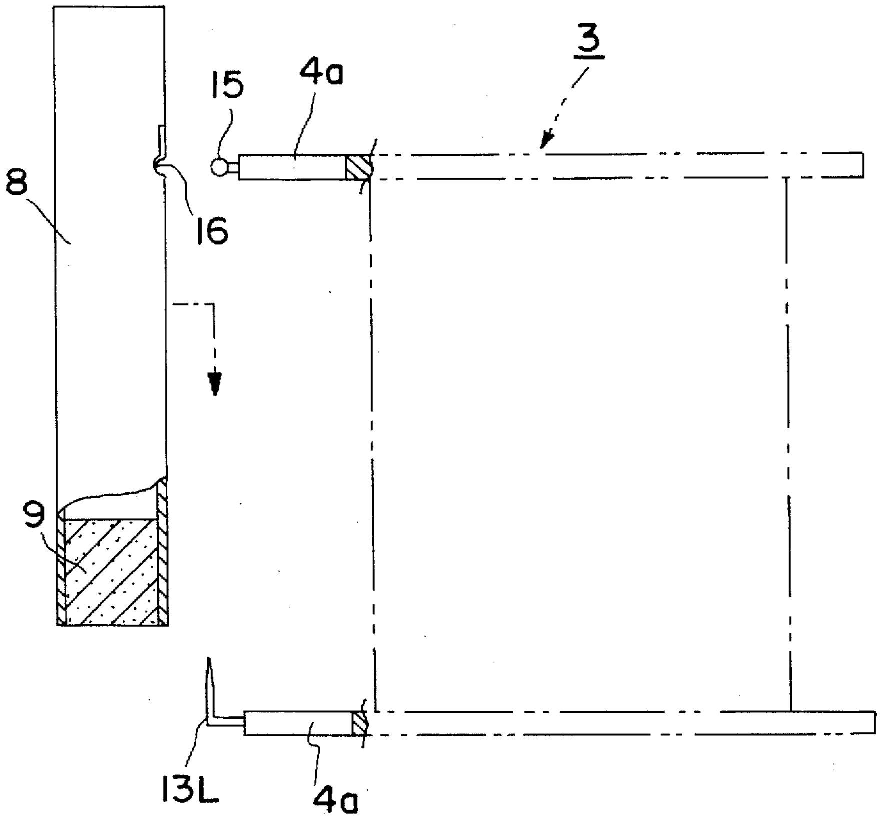
FIG. 6 is a side view showing the structure of the main portion of the high-voltage coil section according to the fourth embodiment.
Figure 7:
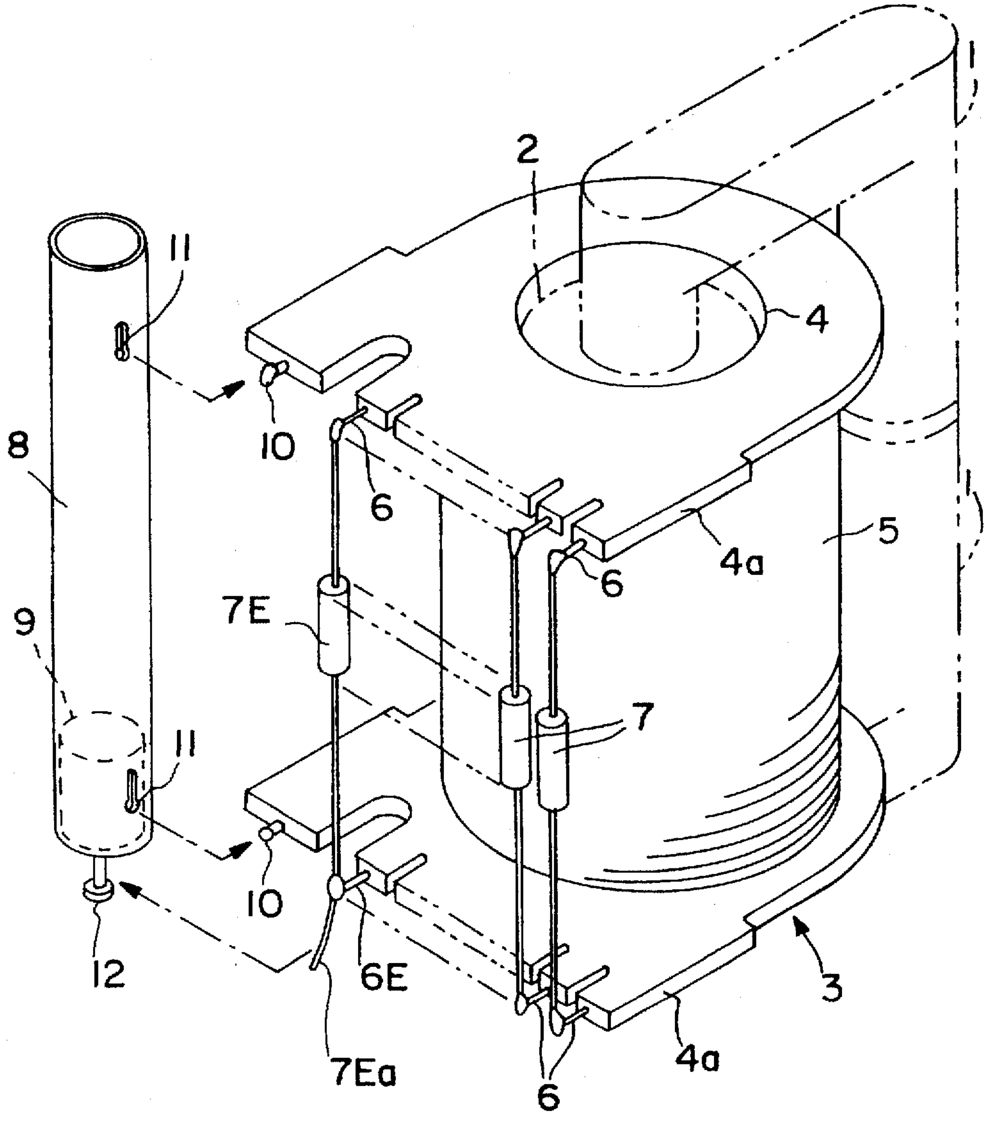
F I G. 7 PRIOR ART
FIG. 7 is a simplified perspective view illustrating the whole structure of a conventional flyback transformer, with a cylindrical holder being not mounted.
Figure 8:
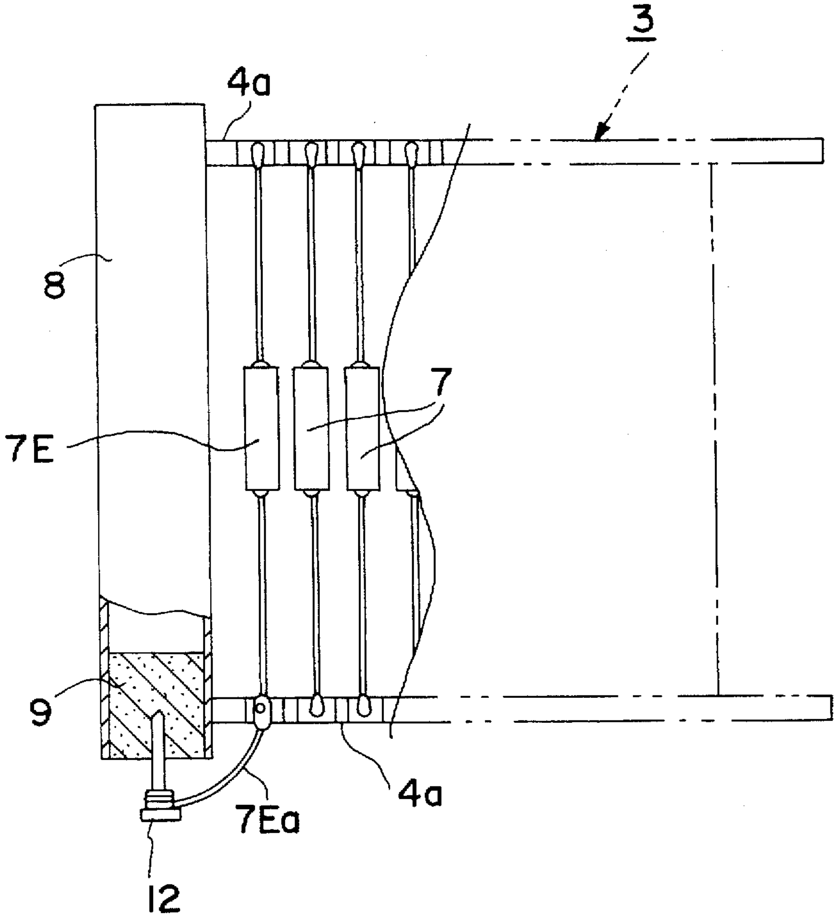
FIG.8 PRIOR ART
FIG. 8 is a side view showing the structure of the main portion of a high-voltage coil section of the conventional flyback transformer.

FIGS. 5 and 6 show a fourth embodiment of the present invention. FIG. 5 is a simplified perspective view illustrating the structure of the high-voltage coil section 3 of a flyback transformer. In this figure, a cylindrical holder is not yet mounted. FIG. 6 is a side view showing the structure of a portion of the high-voltage coil section 3. In the fourth embodiment, a male-contact connection pin 13L protruding from one of the jaw sections 4*a* of the bobbin 4 has a pointed L shape bent toward the other one of the jaw sections 4*a*. This connection pin 13L has been connected to the adjacent mounting pin 6E with a lead or other means, and the cylindrical holder 8 is provided with electrically conductive rubber 9 which is exposed at the bottom of the holder 8. With a protrusion 15 on the bobbin 4 being fit into a fitting hole 16 of the cylindrical holder 8, when the cylindrical holder 8 slides toward the connection pin 13L, the tip of the connection pin 13L is stuck into the electrically conductive rubber 9, connecting the cylindrical holder 8 to the anode end of the high-voltage coil section 3 and securing the holder 8 to the bobbin 4 at the specified position.

In a modified example of the fourth embodiment, a flyback transformer may be configured such that a male-contact connection fitting serves as the connection pin 13L and the cylindrical holder 8 is provided with a female-contact spring connection fitting which clamps onto the male-contact connection. As means for positioning and securing the cylindrical holder 8 to the bobbin 4, various types of structures can be employed in addition to those shown in the figures. For example, the cylindrical holder 8 may be fit in semicircular cuts formed on the jaw sections 4*a* of the bobbin at a portion of the holder 8. Also, the cylindrical holder 8 can have any of a number of cross-sectional shapes other than that of the circular cylinder shown. For instance, the holder 8 can have a square or other rectilinear cross-section.

The above embodiments are illustrative of the invention which is not limited to these embodiments. The scope of the invention is to be determined by the claims appended hereto.

What is claimed is:

1. A flyback transformer comprising:

a bobbin, including jaw sections, of a high-voltage coil section of said flyback transformer;

mounting pins for mounting electrical components, said mounting pins protruding from each of said jaw sections of said bobbin;

a holder for holding an anode lead and housing at least one of an electrically conductive rubber and a connection fitting at one end thereof, said holder being positioned and secured to said bobbin; and a connection pin having a male-contact shape protruding from one of said jaw sections, said connection pin being inserted into and held by one of said electrically conductive rubber and said connection fitting housed in said holder, wherein one of said mounting pins serves as the anode end of said high-voltage coil section and is electrically connected to said one of said electrically conductive rubber and said connection fitting through said connection pin.

2. A flyback transformer according to claim 1, wherein said connection pin and said mounting pin serving as the anode end of said high-voltage coil section are electrically connected with a lead.

3. A flyback transformer according to claim 1, wherein said connection pin and said mounting pin serving as the anode end of said high-voltage coil section are made of bent wire and are continuously formed.

4. A flyback transformer according to claim 1, wherein said connection pin and said mounting pin serving as the anode end of said high-voltage coil section are continuously formed and embedded in one of said jaw sections.

5. A flyback transformer according to claim 1, wherein said connection pin is in the shape of a straight pin and a side of said holder includes a slot through which said connection pin is inserted into said electrically conductive rubber.

6. A flyback transformer according to claim 1, wherein said connection pin is inserted into said connection fitting through a slot in a side of said holder.

7. A flyback transformer according to claim 1, wherein said connection pin is in the shape of an L-shaped pointed pin and a bottom of said holder includes an opening through which said connection pin is inserted into said electrically conductive rubber.

8. A lead wire connection comprising:

a holder for holding a lead wire and housing at least one of an electrically conductive rubber and a connection fitting at one end thereof, said holder being positioned and secured to a first point on an electrical component at one end by an electrically non-conducting connector; and a connection pin having a male-contact shape protruding from at a second point on said electrical component which is spaced from said first point, said connection pin being inserted into and held by one of an electrically conductive rubber and a connection fitting housed in said holder.

9. A lead wire connection according to claim 8, wherein said connection pin is in the shape of a straight pin and a side of said holder includes a slot through which said connection pin is inserted into said electrically conductive rubber.

10. A lead wire connection flyback transformer according to claim 8, wherein said connection pin is clamped by said connection fitting by inserting it through a slot in a side of said holder.

11. A lead wire connection according to claim 8, wherein said connection pin is in the shape of an L-shaped pointed pin and a bottom of said holder includes an opening through which said connection pin is inserted into said electrically conductive rubber.

12. A lead wire connection according to claim 8, wherein said connection fitting is a key-hole slot and a pin with an enlarged head portion for engaging said key-hole slot.

* * * * *